(12) United States Patent
Gilmore et al.

(10) Patent No.: US 12,397,737 B1
(45) Date of Patent: Aug. 26, 2025

(54) ACTIVE TETHERS FOR PROGRAMMABLE SHAPE DEPLOYMENT OF AIRBAGS

(71) Applicant: TOYOTA MOTOR ENGINEERING & MANUFACTURING NORTH AMERICA, INC., Plano, TX (US)

(72) Inventors: Paul Gilmore, Howell, MI (US);
Yuyang Song, Ann Arbor, MI (US);
Phouvadol Khouphongsy, Saline, MI (US); Umesh Gandhi, Farmington Hills, MI (US)

(73) Assignees: TOYOTA MOTOR ENGINEERING & MANUFACTURING NORTH AMERICA, INC., Plano, TX (US);
TOYOTA JIDOSHA KABUSHIKI KAISHA, Aichi Ken (JP)

( * ) Notice: Subject to any disclaimer, the term of this patent is extended or adjusted under 35 U.S.C. 154(b) by 0 days.

(21) Appl. No.: 18/796,129

(22) Filed: Aug. 6, 2024

(51) Int. Cl.
  *B60R 21/2338* (2011.01)
  *B60R 21/01* (2006.01)
(52) U.S. Cl.
  CPC .......... *B60R 21/2338* (2013.01); *B60R 21/01* (2013.01); *B60R 2021/01286* (2013.01)

(58) Field of Classification Search
  CPC ................ B60R 21/2338; B60R 21/01; B60R 2021/01286
  See application file for complete search history.

(56) References Cited

U.S. PATENT DOCUMENTS

| | | | |
|---|---|---|---|
| 6,237,949 B1 | 5/2001 | Nozumi et al. | |
| 10,434,973 B2 * | 10/2019 | Gandhi | B60R 21/01516 |
| 10,596,992 B2 | 3/2020 | Choi | |
| 11,718,264 B1 | 8/2023 | Khouphongsy et al. | |
| 2010/0264632 A1 | 10/2010 | Bacher et al. | |

FOREIGN PATENT DOCUMENTS

| | | |
|---|---|---|
| JP | 2011213196 A | 10/2011 |
| JP | 4990691 B2 | 8/2012 |
| KR | 101619542 B1 | 5/2016 |
| KR | 102352146 B1 | 1/2022 |

* cited by examiner

*Primary Examiner* — Jason D Shanske
*Assistant Examiner* — Joselynn Y Sliteris
(74) *Attorney, Agent, or Firm* — HAYNES AND BOONE, LLP

(57) ABSTRACT

A system includes a vehicle, an airbag located within the vehicle, an elongatable tether anchored to the airbag at both ends, and an actuator configured to control the elongatable tether. In a first state of the actuator, the tether elongates when the airbag is inflated, and in a second state of the actuator, the tether does not elongate when the airbag is inflated.

19 Claims, 20 Drawing Sheets

ACTIVE TETHERS FOR PROGRAMMABLE SHAPE DEPLOYMENT OF AIRBAGS

TECHNICAL FIELD

The subject matter described herein relates to devices, systems, and methods for programmably controlling the shape of an airbag as it deploys. This technology has particular but not exclusive utility for increasing occupant safety for cars and trucks.

BACKGROUND

Modern vehicles include driver-side and passenger-side airbags, as well as potentially other airbags such as door airbags, knee protection airbags, etc. However, different crash modes can induce different speeds and directions of motion for the vehicle occupants. In some cases, this can cause occupant body parts, such as the head, to miss the airbag or to be only partially protected by the airbag. Thus, there is a need for improved airbags that provide protection to occupants across a broad range of different crash modes.

The information included in this Background section of the specification, including any references cited herein and any description or discussion thereof, is included for technical reference purposes only and is not to be regarded as limiting.

SUMMARY

The present disclosure provides an airbag whose shape is programmable at the time of deployment. The airbag includes programmable tethers that either engage to restrict the expansion of the airbag along a particular axis, or disengage to allow expansion along that axis. Through the use of one or more programmable tethers, the shape of the airbag can be adjusted to respond to different crash modes. The shape-programmable airbag disclosed herein has particular, but not exclusive, utility for improving crash safety in cars and trucks.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system that includes a vehicle. The system also includes an airbag disposed within the vehicle, and an elongatable tether anchored to the airbag at a first end and a second end. The system also includes an actuator configured to control the elongatable tether such that: in a first state of the actuator, the tether elongates when the airbag is inflated; and in a second state of the actuator, the tether does not elongate when the airbag is inflated. Other embodiments of this aspect include corresponding computer systems, apparatus, and computer programs recorded on one or more computer storage devices, each configured to perform the actions of the methods.

Implementations may include one or more of the following features. In some embodiments, in the first state of the actuator, the airbag to inflates to a first shape, and in the second state of the actuator, the tether causes the airbag to inflate to a second shape different than the first shape. In some embodiments, the control unit is configured to operate the actuator between the first state and the second state based on a measurement received from the at least one sensor. In some embodiments, the measurement received from the at least one sensor is indicative of a mass or size of an occupant of the vehicle. In some embodiments, if the mass or size of the occupant of the vehicle is below a threshold value, the control unit controls the actuator to be in the second state, such that the tether causes the airbag to inflate into the second shape. In some embodiments, the second shape is configured for protection of the vehicle occupant of the size or mass below the threshold value. In some embodiments, the measurement received from the at least one sensor is indicative of a crash mode. In some embodiments, if the crash mode is a first crash mode, the control unit controls the actuator to be in the first state such that the airbag inflates into the first shape, and if the crash mode is a second crash mode, the control unit controls the actuator to be in the second state such that the airbag inflates into the second shape. In some embodiments, the first shape is configured to protect a vehicle occupant in the first crash mode, and the second shape is configured to protect the vehicle occupant in the second mode. In some embodiments, the actuator is an electrostatic clutch or electroadhesive clutch. In some embodiments, the system may include: a second elongatable tether; and a second actuator configured to control the second elongatable tether such that: in a first state of the second actuator, the second elongatable tether elongates when the airbag is inflated; and in a second state of the actuator, the second elongatable tether does not elongate when the airbag is inflated. In some embodiments, the actuator is operable independently of the second actuator. Implementations of the described techniques may include hardware, a method or process, or computer software on a computer-accessible medium.

One general aspect includes a method. The method includes providing an airbag disposed within a vehicle. The method also includes anchoring an elongatable tether to the airbag at a first end and a second end. The method also includes with an actuator, controlling the elongatable tether such that: in a first state of the actuator, the tether elongates when the airbag is inflated; and in a second state of the actuator, the tether does not elongate when the airbag is inflated. Other embodiments of this aspect include corresponding computer systems, apparatus, and computer programs recorded on one or more computer storage devices, each configured to perform the actions of the methods.

Implementations may include one or more of the following features. In some embodiments, in the first state of the actuator, the airbag to inflates to a first shape, and in the second state of the actuator, the tether causes the airbag to inflate to a second shape different than the first shape. In some embodiments, the method may include: providing at least one sensor disposed within the vehicle; and with a control unit disposed within the vehicle and may include a processor and a memory, operating the actuator between the first state and the second state based on a measurement received from the at least one sensor. In some embodiments, the measurement received from the at least one sensor is indicative of a mass or size of an occupant of the vehicle. In some embodiments, if the mass or size of the occupant of the vehicle is below a threshold value, the control unit controls the actuator to be in the second state, such that the tether causes the airbag to inflate into the second shape. In some embodiments, the measurement received from the at least one sensor is indicative of a crash mode. In some embodiments, if the crash mode is a first crash mode, the control unit controls the actuator to be in the first state such that the airbag inflates into the first shape, and if the crash mode is a second crash mode, the control unit controls the actuator to be in the second state such that the airbag inflates into the second shape. Implementations of the described techniques may include hardware, a method or process, or computer software on a computer-accessible medium.

One general aspect includes an apparatus that includes an airbag. The apparatus also includes an elongatable tether stitched to the airbag at a first end and a second end. The apparatus also includes an electrostatic clutch or electroadhesive clutch configured to control the elongatable tether such that: in an off state of the electrostatic clutch or electroadhesive clutch, the tether elongates when the airbag is inflated such that the airbag inflates to a first shape; and in an on state of the electrostatic clutch or electroadhesive clutch, the tether does not elongate when the airbag is inflated, such that the airbag inflates to a second shape different than the first shape. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the shape-programmable airbag, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
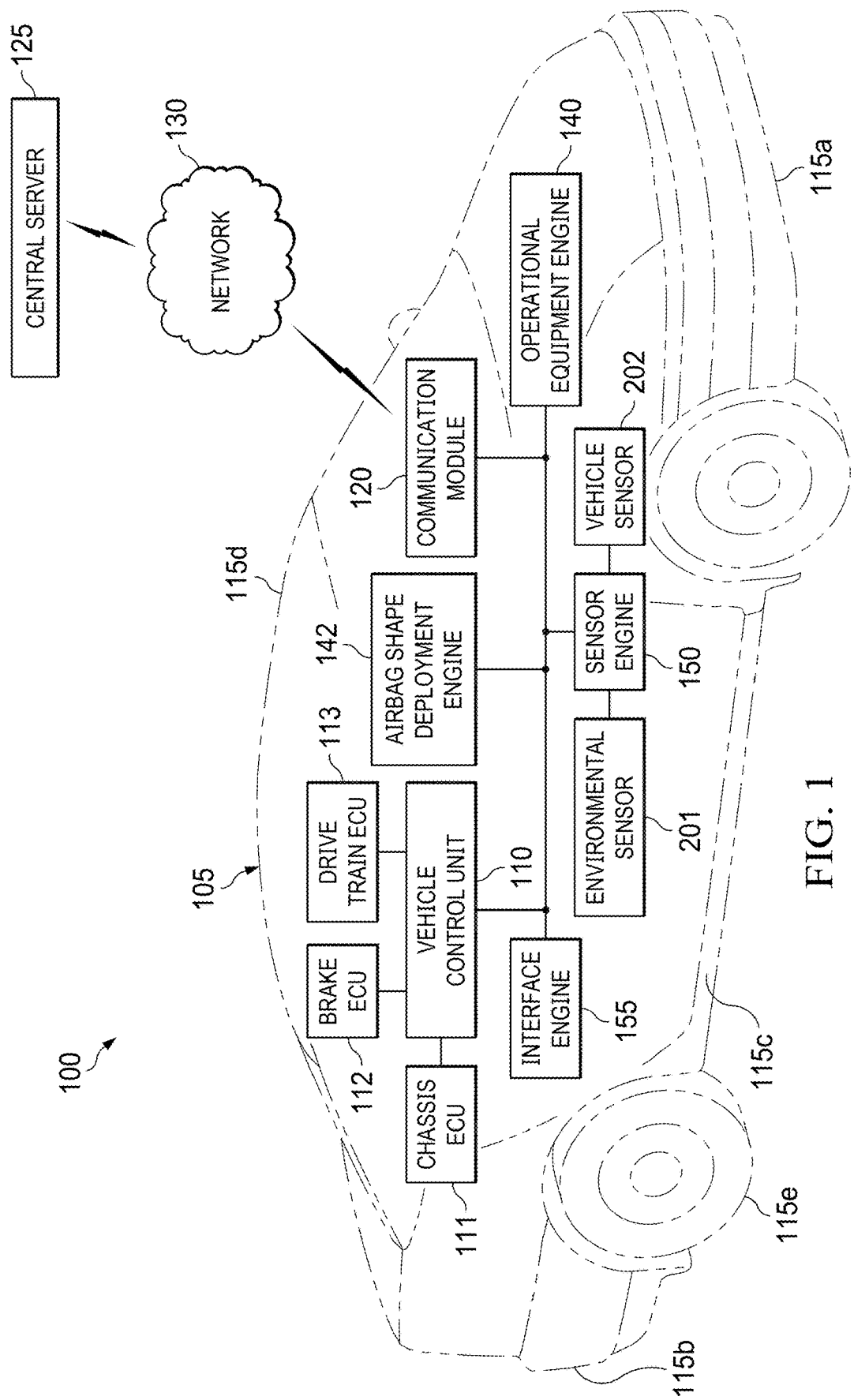
FIG. 1 is a diagrammatic illustration of a shape-programmable airbag system in accordance with at least one embodiment of the present disclosure.

Currently, airbags deploy to a fixed final shape. The final shape cannot be changed depending on the crash mode or occupant position, except by breakaway tethers that detach when a certain load is exceeded. A goal of the present application is to actively control the final shape of the deployed airbag depending on various crash scenarios and occupant position/orientation (especially in future advanced driver-assist system (ADAS) vehicles where occupants may be lying down, turned, etc.). Overall crash safety may be improved if each airbag in the vehicle has a controllable shape.

In accordance with at least one embodiment of the present disclosure, a shape-programmable airbag is provided whose shape is programmable at the time of deployment. The airbag includes programmable tethers (e.g., electrostatic or electroadhesive clutches) that can be commanded (e.g., by a crash electronic control unit or crash ECU) to engage, and thus to restrict the expansion of the airbag along a particular axis. If a tether is not commanded to engage, or is commanded to disengage, it can then allow expansion along that particular axis. Through the use of one or more programmable tethers, the shape of the airbag can be adjusted in real time to respond to different crash modes. The shape-programmable airbag disclosed herein has particular, but not exclusive, utility for improving crash safety in cars and trucks.

The present disclosure aids substantially in the protection of vehicle occupants during a crash, by improving the ability of the airbag to place itself between the vehicle occupant(s) and hard surfaces that may cause injury. Implemented using programmable tethers in communication with sensors and a processor, the shape-programmable airbag disclosed herein provides practical, real-time control over the shape or the airbag as it deploys. This improved airbag tether system transforms a fixed-shape airbag into one whose shape can respond dynamically to different crash modes. This unconventional approach improves the functioning of the vehicle, by reducing the amount of damage sustained by vehicle occupants during a crash.

The shape-programmable airbag may be implemented for example through a crash ECU in communication with a plurality of sensors, and operated by a control process executing on a processor that accepts inputs from sensors. In that regard, the control process performs certain specific operations in response to different inputs or received at different times. Certain structures, functions, and operations of the processor, airbag, and sensors are known in the art, while others are recited herein to enable novel features or aspects of the present disclosure with particularity.

These descriptions are provided for exemplary purposes only, and should not be considered to limit the scope of the shape-programmable airbag. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic illustration of a shape-programmable airbag system in accordance with at least one embodiment of the present disclosure. In an example, a shape-programmable airbag system is referred to by the reference numeral 100 and includes a vehicle 105, such as an automobile, and a vehicle control unit 110 located on the vehicle 105. The vehicle 105 may include a front portion 115*a* (including a front bumper), a rear portion 115*b* (including a rear bumper), a right side portion 115*c* (including a right front quarter panel, a right front door, a right rear door, and a right rear quarter panel), a left side portion 115*d* (including a left front quarter panel, a left front door, a left rear door, and a left rear quarter panel), and wheels 115*e*. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the shape-programmable airbag system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and an airbag shape deployment engine 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
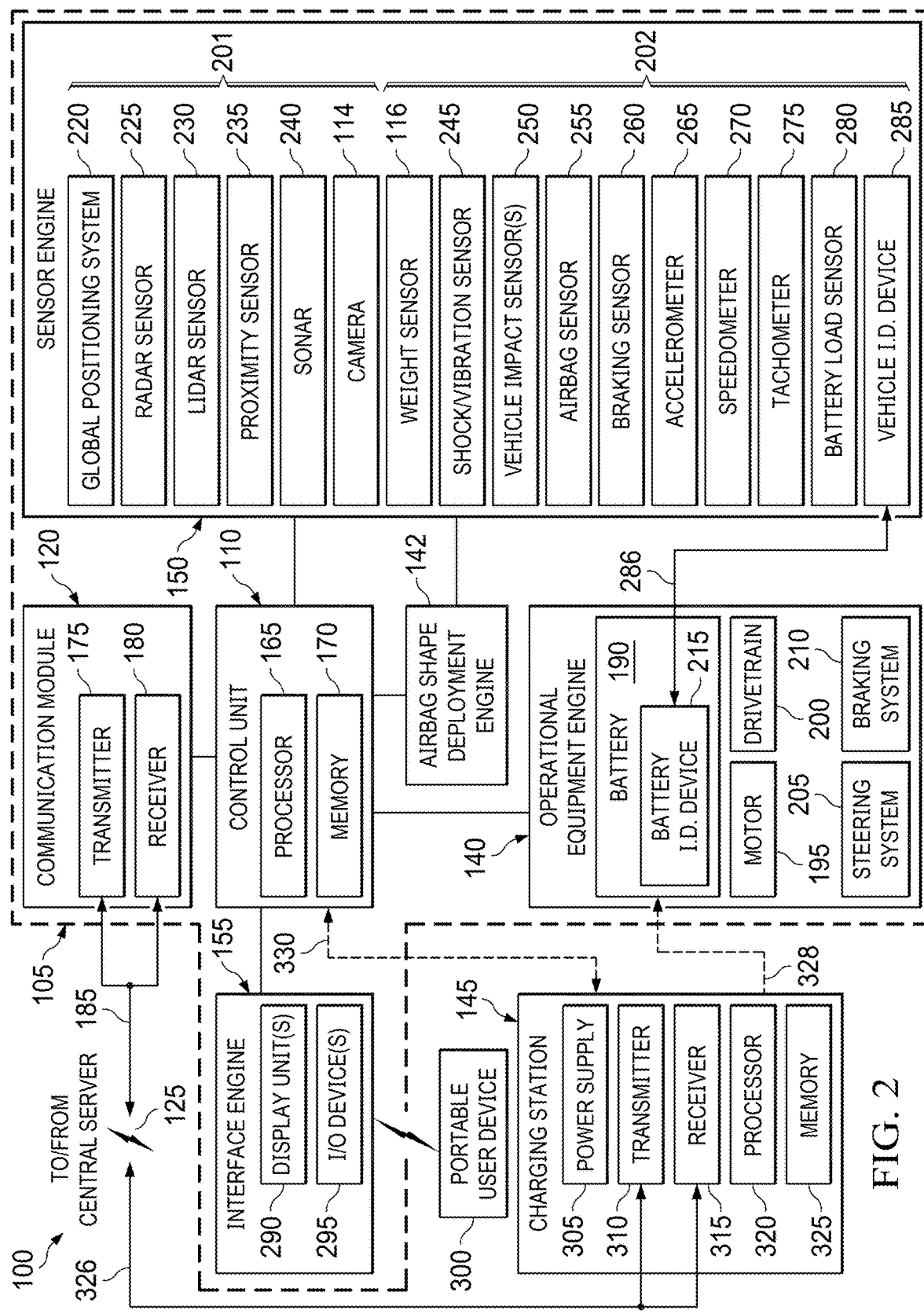
FIG. 2 is a diagrammatic illustration, in a block-diagram form, of at least a portion of the shape-programmable airbag system of FIG. 1, in accordance with at least one embodiment of the present disclosure.

FIG. 2 is a diagrammatic illustration, in a block-diagram form, of at least a portion of the shape-programmable airbag system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a radar sensor 225, a lidar sensor 230, a proximity sensor 235, a sonar sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a camera 114, a weight sensor 116, or any combinations thereof. The sensors or other detection devices may be configured to sense or detect activity, conditions, and circumstances in an area to which the device has access, e.g., conditions inside or outside the vehicle cabin. Such sensors may include, but are not limited to, angle sensors, rotary encoders, or linear encoders. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seat back, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The shape-programmable airbag system 100 also includes an airbag shape deployment engine 142, the operation of which will be described below. In some embodiments, the airbag shape deployment engine 142 comprises a standalone housing with its own processor and memory. In other embodiments, the airbag shape deployment engine 142 exists at least partially as software, firmware, or hardware within another processor, such as the vehicle control unit 110, operational equipment engine 140, or power train ECU 113. The sensor engine 150 includes environmental sensors 201 and vehicle sensors 202.

A reader of ordinary skill in the art will understand that other components or arrangements of components may be found in a vehicle 105, and that the same general principles apply to electric vehicles, internal combustion vehicles, and hybrid vehicles.

Figure 3:
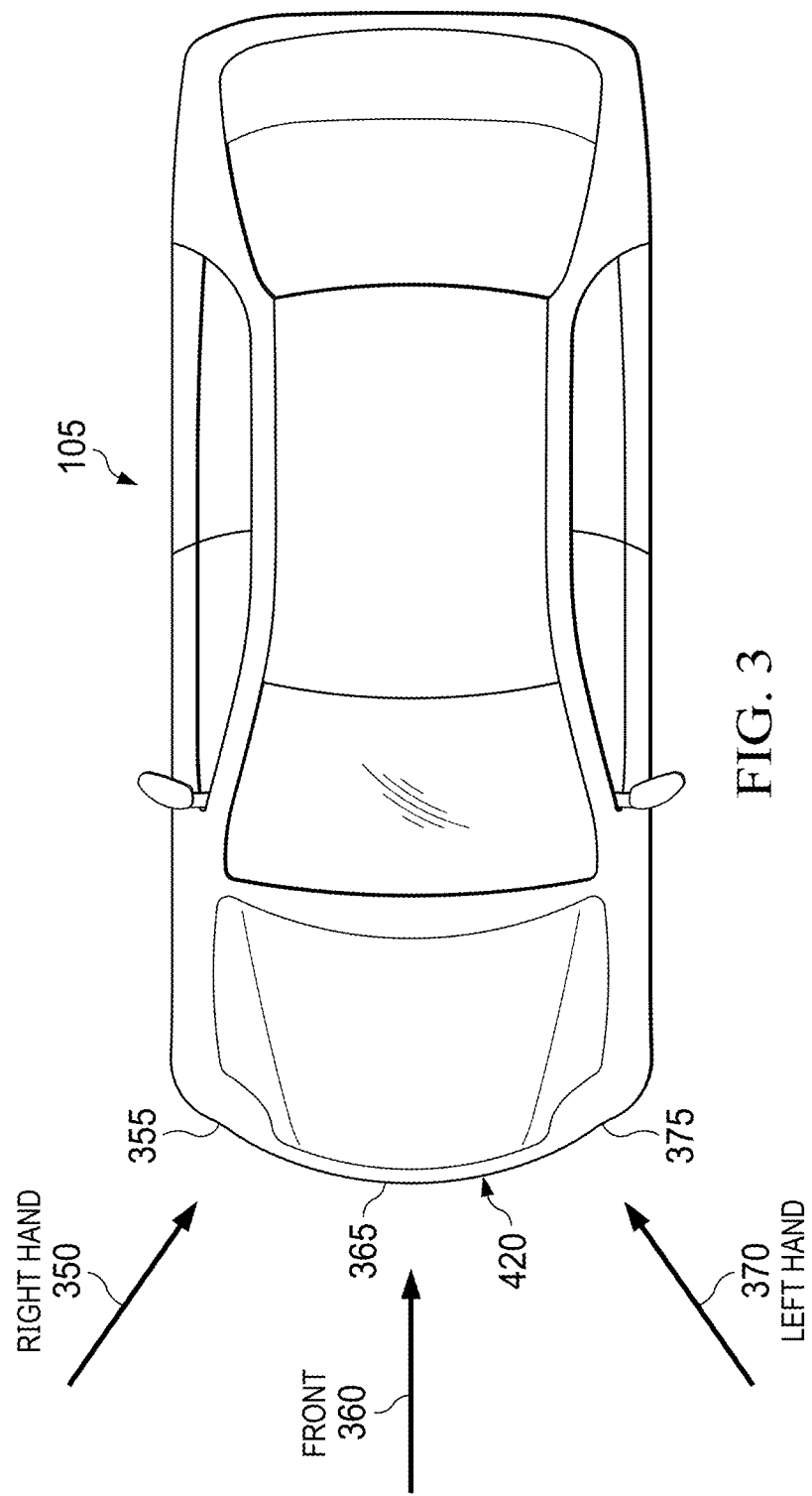
FIG. 3 is a diagram showing different crash modes of a vehicle, in accordance with at least one embodiment of the present disclosure.

FIG. 3 is a diagram showing different crash modes 350, 360, 370 of a vehicle 105, in accordance with at least one embodiment of the present disclosure. In a right-hand crash mode 350, a barrier first contacts the right-hand portion 355 of the vehicle front bumper 420. In a front crash mode 360, the barrier first contacts the center 365 of the bumper 420. In a left-hand crash mode 370, the barrier first contacts the left-hand portion 375 of the bumper 420. Other crash modes are possible, including but not limited to rear-end collisions, side-impact collisions, rollovers, etc. Each crash mode can occur at any speed, from very low speed (e.g., 1 mile per hour) to very high speed (e.g., 100 miles per hour), and each mode and speed involves different dynamics and trajectories for the occupants inside the vehicle. Occupants also vary in size and weight, and thus may require different airbag geometry to limit injury. It is noted that larger airbags may provide a larger protection area but require longer to inflate, have reduced pressure, or need additional inflators. It may thus be desirable to keep the airbag inflation size smaller and directed only in the needed direction. Thus, a need exists for airbag systems capable of adapting to different crash modes and speeds.

Figure 4:
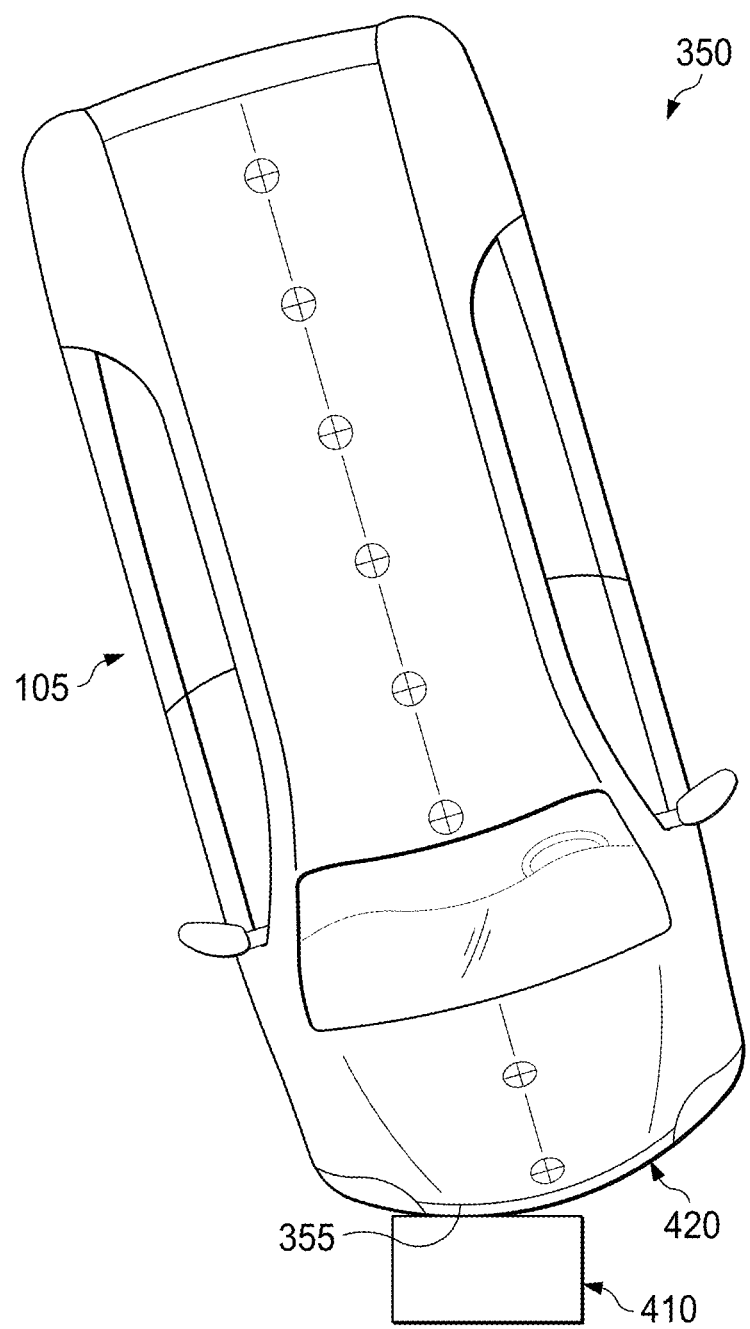
FIG. 4 is a top view of a right-hand frontal crash mode of a vehicle, in accordance with at least one embodiment of the present disclosure.

FIG. 4 is a top view of a right-hand frontal crash mode 350 of a vehicle 105, in accordance with at least one embodiment of the present disclosure. In the right-hand crash mode 350, the right portion 355 of the bumper 420 is the first part of the vehicle 105 to contact the barrier 410.

Figure 5:
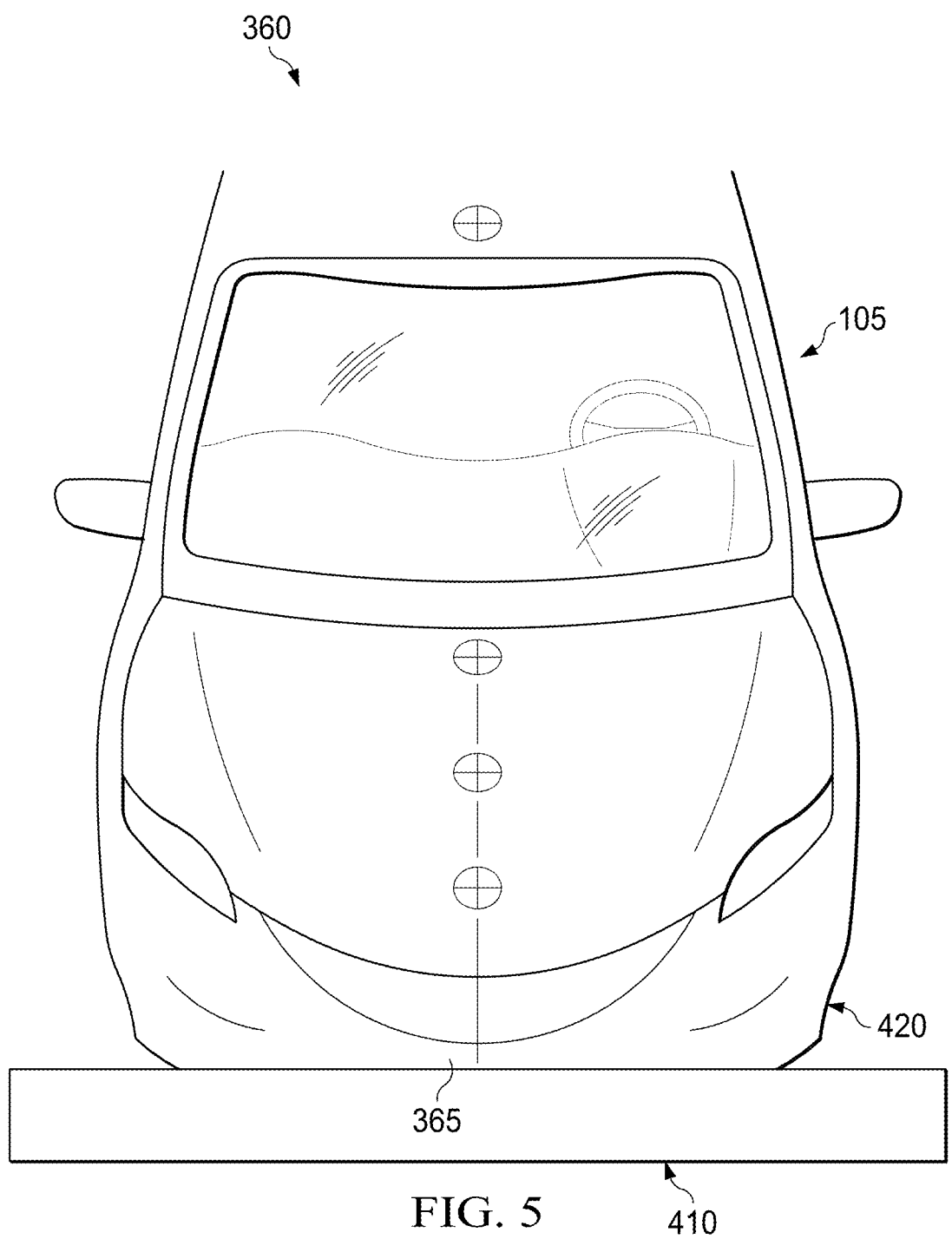
FIG. 5 is a top front view of a front crash mode of a vehicle, in accordance with at least one embodiment of the present disclosure.

FIG. 5 is a top front view of a front crash mode 360 of a vehicle 105, in accordance with at least one embodiment of the present disclosure. In the front crash mode 360, the center portion 365 of the bumper 420 is the first part of the vehicle 105 to contact the barrier 410.

Figure 6:
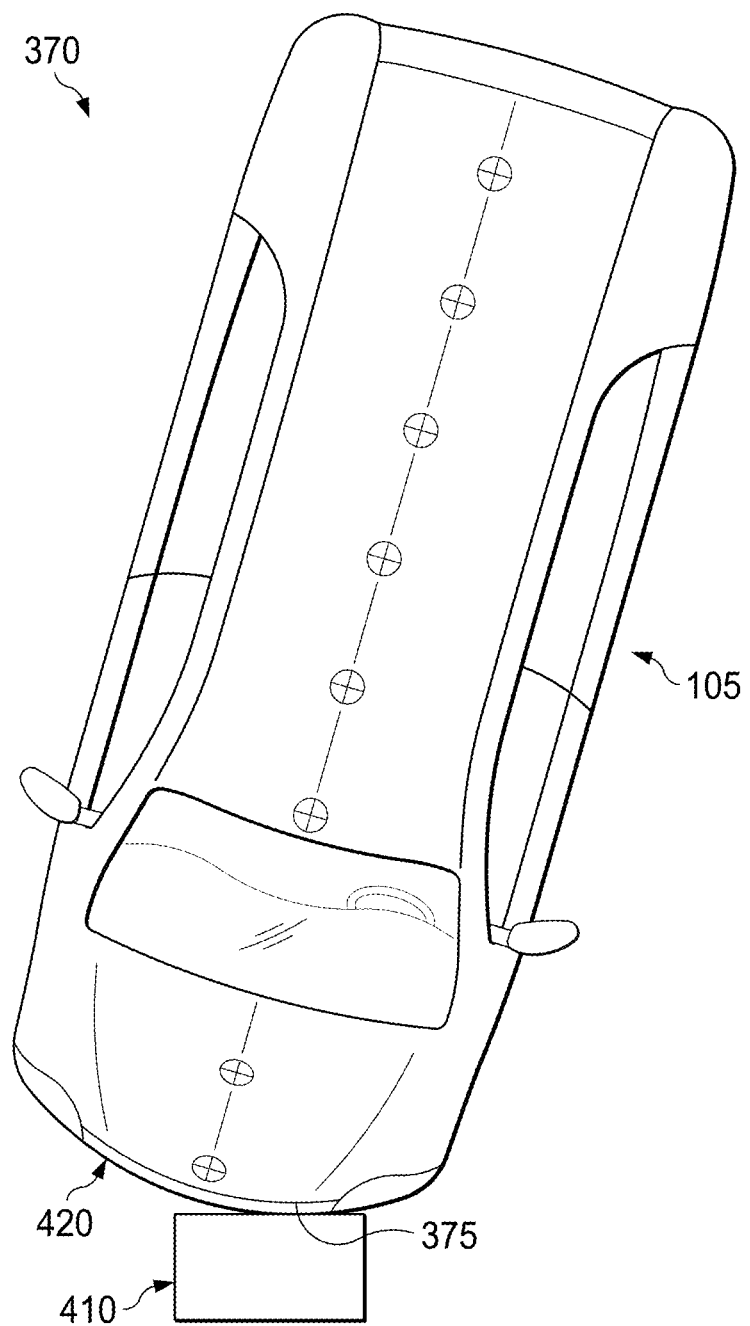
FIG. 6 is a top view of a left-hand frontal crash mode of a vehicle, in accordance with at least one embodiment of the present disclosure.

FIG. 6 is a top view of a left-hand frontal crash mode 370 of a vehicle 105, in accordance with at least one embodiment of the present disclosure. In the left-hand crash mode 370, the left portion 375 of the bumper 420 is the first part of the vehicle 105 to contact the barrier 410.

Figure 7:
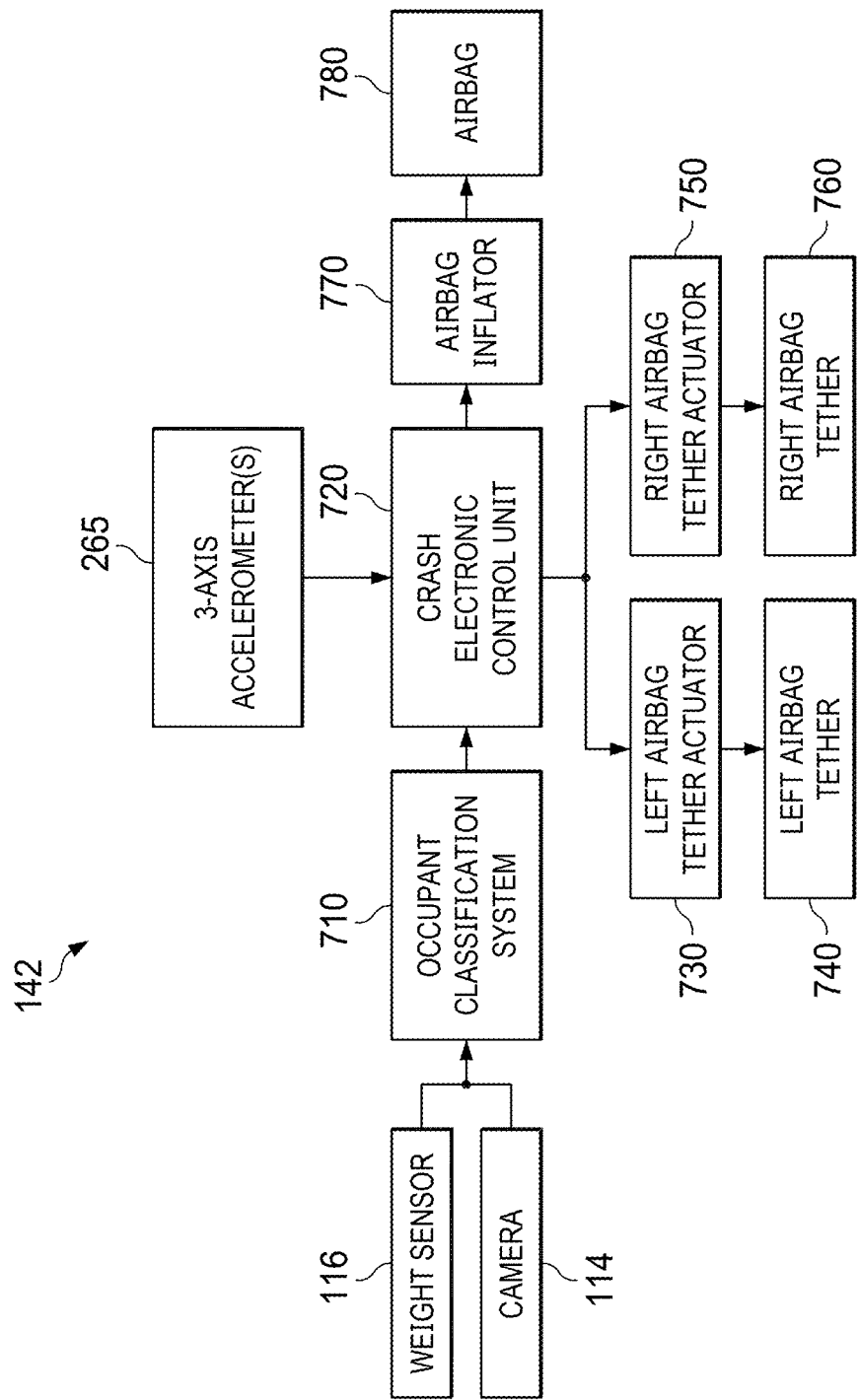
FIG. 7 is a schematic, diagrammatic representation, in block diagram form, of an example airbag shape deployment engine, in accordance with at least one embodiment of the present disclosure.

FIG. 7 is a schematic, diagrammatic representation, in block diagram form, of an example airbag shape deployment engine 142, in accordance with at least one embodiment of the present disclosure. In the example shown in FIG. 7, the airbag shape deployment engine 142 includes an occupant classification system (OCS) 710 and a crash electronic control unit or crash ECU 720. The occupant classification system 710 may for example be responsible for determining which seats within the vehicle are occupied, as well as the mass, size, and/or orientation of the occupants, and passing this information to the crash ECU 720. Thus, depending on the implementation, the occupant classification system 710 may receive real-time sensor data from a weight sensor 116 and/or a camera 114.

The crash ECU 720 may for example be responsible for determining which airbags to inflate based on seat occupancy. Thus, the crash ECU controls the airbag inflator 770 which inflates the airbag 780. In the example shown in FIG. 7, the crash ECU 720 is also responsible for determining the shape of the airbag 780 based on the crash mode, crash speed, occupant size or weight, etc. The shape of the airbag 780 is controlled by left and right tethers 740 and 760, which are respectively controlled by left and right tether actuators 730 and 750.

In an example, the tethers 740, 760 may be capable of lengthening, and may for example include fabric or polymer strips that are capable of sliding against one another in order to lengthen the tether. The tether actuators 730, 750 may for example be electrostatic clutches or electroadhesive clutches that, when engaged, prevent the tethers from lengthening and, when disengaged, allow the tethers to lengthen. When a tether 740 or 760 is prevented from lengthening, it limits expansion of the airbag 780 along the axis of the tether, and thus controls the shape of the airbag 780, as described in more detail in FIGS. 13A-13C, below.

Although FIG. 7 shows only one airbag 780, it is understood that the vehicle may contain many airbags, each with its own inflator, tether actuators, and tethers. Similarly, although the airbag 780 of FIG. 7 includes two tethers 740, 760, it is understood that airbags may include any number of tethers, including for example one tether, three tethers, or more. Furthermore, although the tethers are described as being left and right tethers, it is understood that, depending on the desired airbag geometry there may, instead or in addition, be top tethers, bottom tethers, longitudinal tethers, lateral tethers, diagonal tethers, and otherwise.

Block diagrams are provided herein for exemplary purposes; a person of ordinary skill in the art will recognize myriad variations that nonetheless fall within the scope of the present disclosure. Block diagrams may show a particular arrangement of components, modules, services, steps, processes, or layers, resulting in a particular signal flow. It is understood that some embodiments of the systems disclosed herein may include additional components, that some components shown may be absent from some embodiments, and that the arrangement of components may be different than shown, resulting in different signal flows while still performing the methods described herein.

Figure 8:
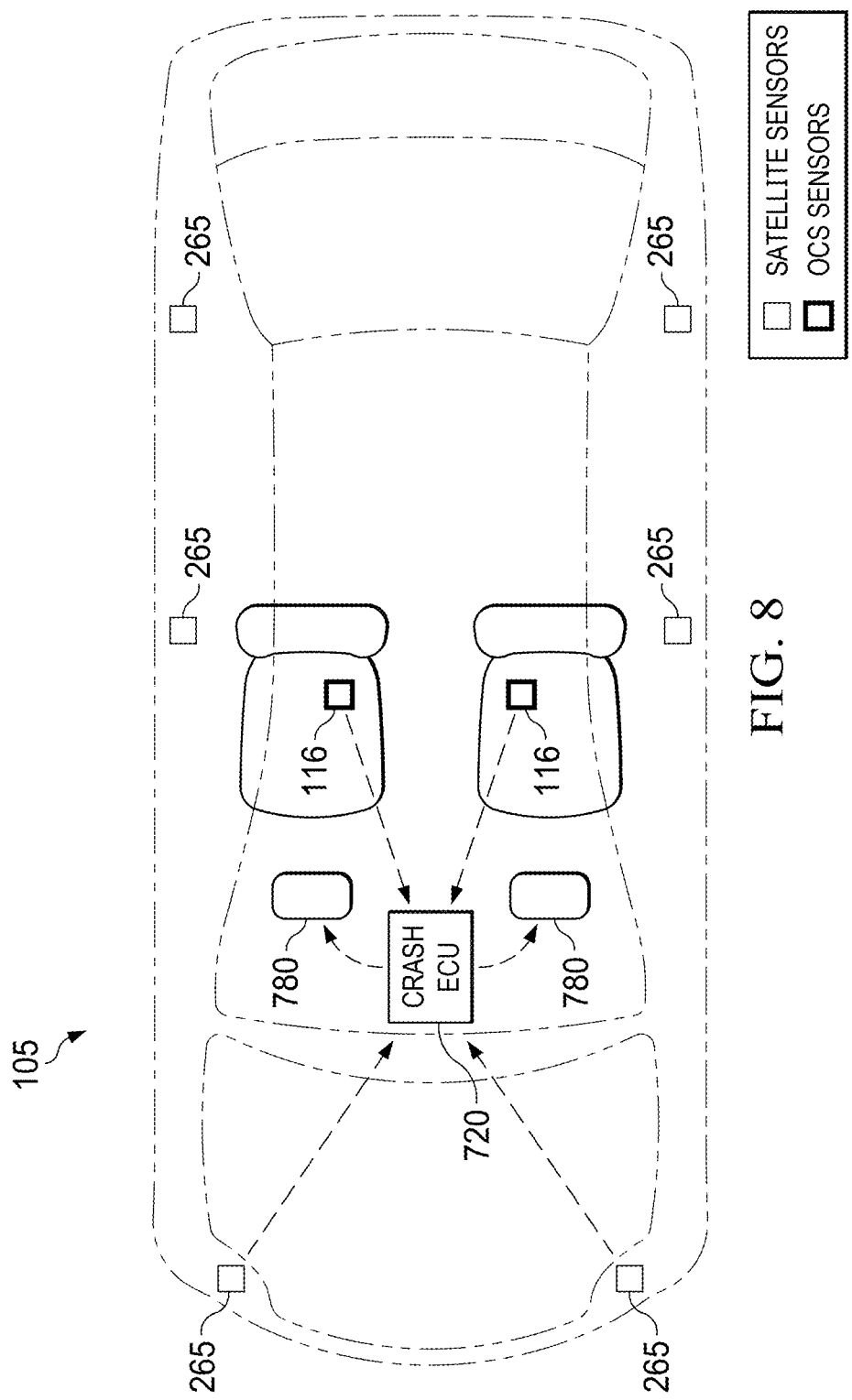
FIG. 8 is a top cross-sectional view of a vehicle, in accordance with at least one embodiment of the present disclosure.

FIG. 8 is a top cross-sectional view of a vehicle 105, in accordance with at least one embodiment of the present disclosure. In the example shown in FIG. 8, the vehicle includes OCS sensors 116, which may for example be weight sensors located in the driver and passenger seats, and satellite sensors or crash sensors 265, which may for example be load cells or accelerometers distributed around the periphery of the vehicle 105. The OCS sensors 116 enable the OCS 710 (see FIG. 7) to determine seat occupancy and occupant size/mass. The satellite sensors or crash sensors 265 enable the crash ECU 720 to determine the crash mode and thus determine which airbags 780 to inflate. For example, if a force or acceleration is detected on the right front portion of the vehicle before any similar force or acceleration is detected at any of the other satellite sensors 265, then the crash ECU 720 may conclude that a right-hand frontal crash is occurring.

Figure 9A:
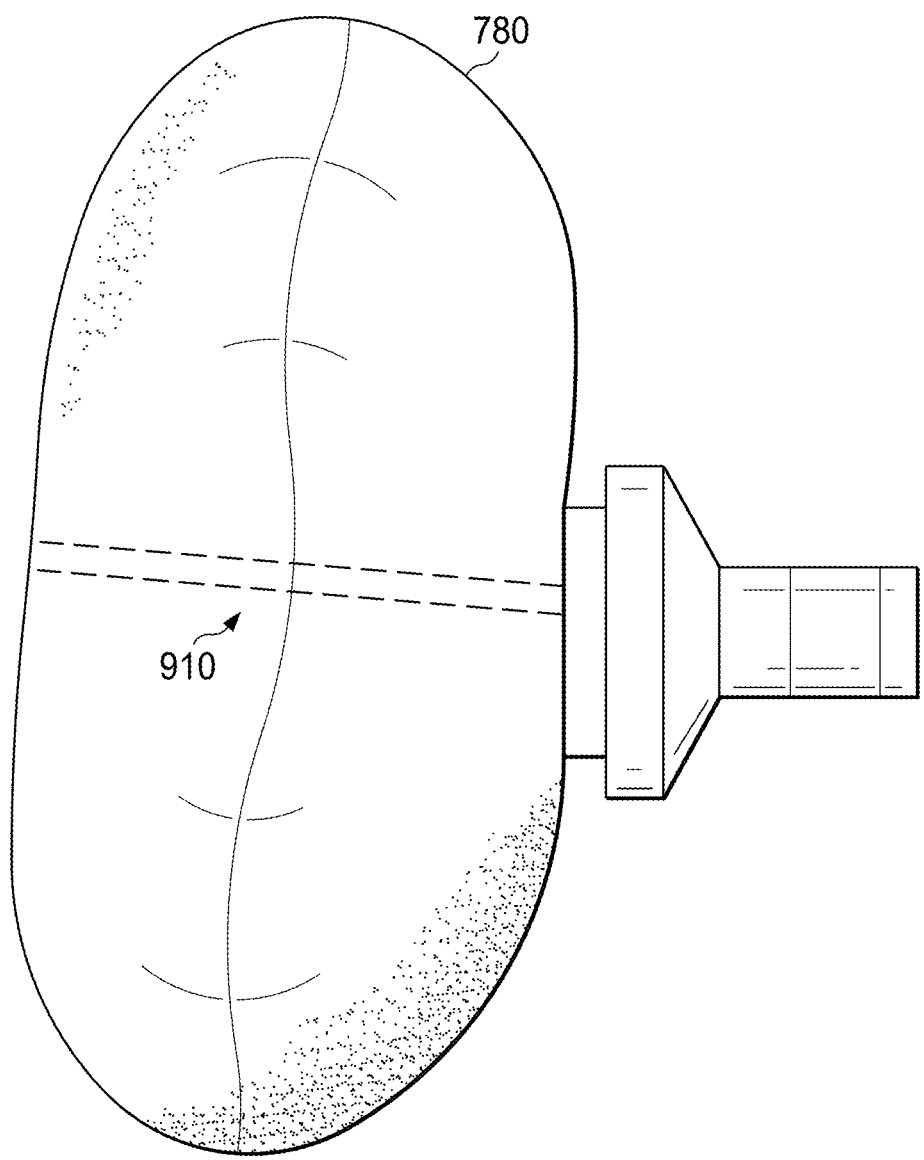
FIG. 9A is a side view of a tethered airbag with an axial or longitudinal tether engaged, in accordance with at least one embodiment of the present disclosure.

FIG. 9A is a side view of a tethered airbag 780 with an axial or longitudinal tether 910 engaged, in accordance with at least one embodiment of the present disclosure. With the axial or longitudinal tether engaged (e.g., with an electrostatic clutch turned on to prevent lengthening of the tether), the airbag is limited to a first size when fully inflated.

Figure 9B:
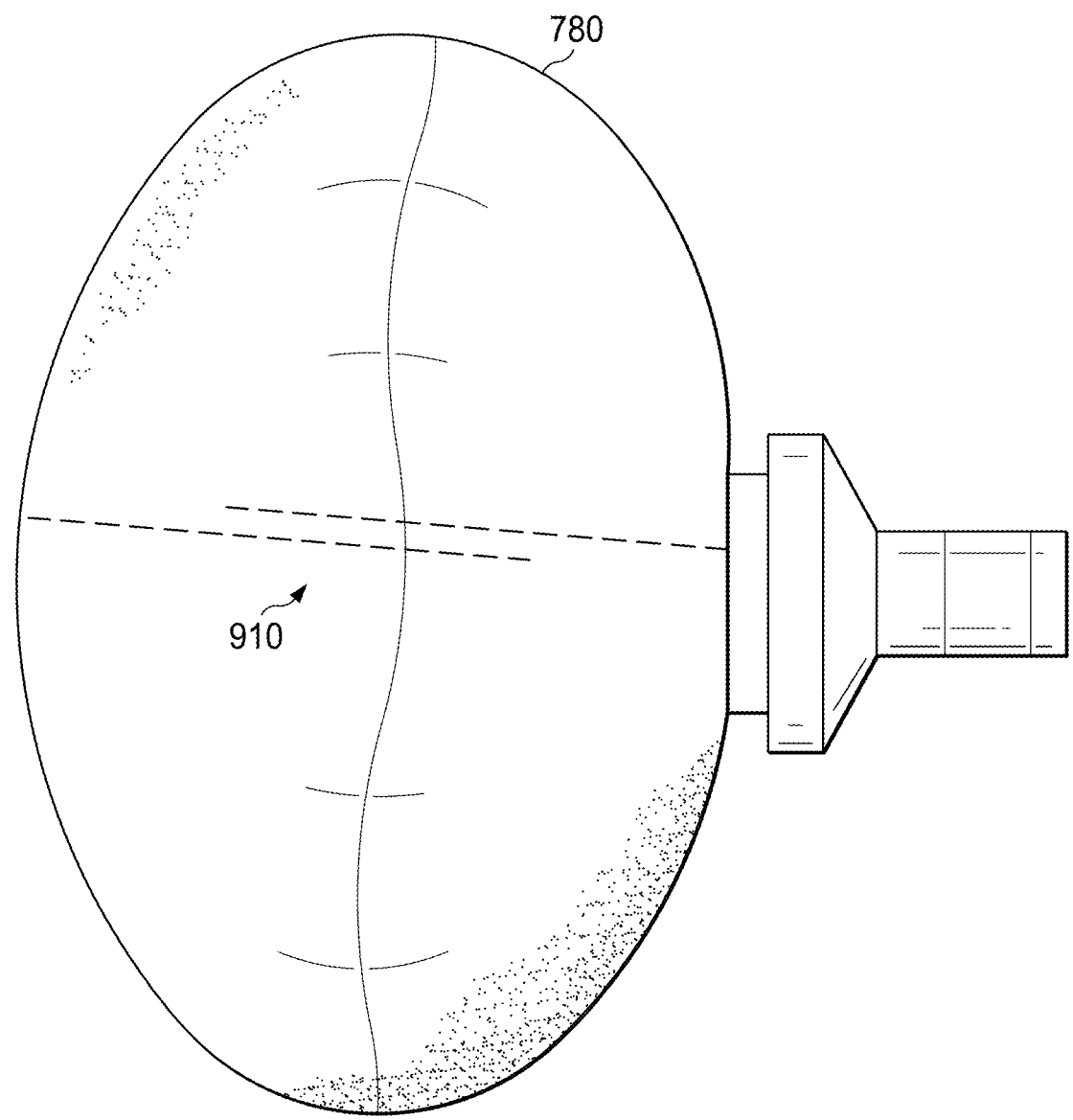
FIG. 9B is a side view of an untethered airbag, with the axial or longitudinal tether disengaged, in accordance with at least one embodiment of the present disclosure.

FIG. 9B is a side view of an untethered airbag 780, with the axial or longitudinal tether disengaged, in accordance with at least one embodiment of the present disclosure. With the axial or longitudinal tether 910 disengaged (e.g., with the electrostatic clutch turned off to permit lengthening of the tether), the airbag is able to expand to a second size when fully inflated, where the second size is larger than the first size. Thus, the size and shape of the deployed airbag is controlled by the tether.

Figure 10A:
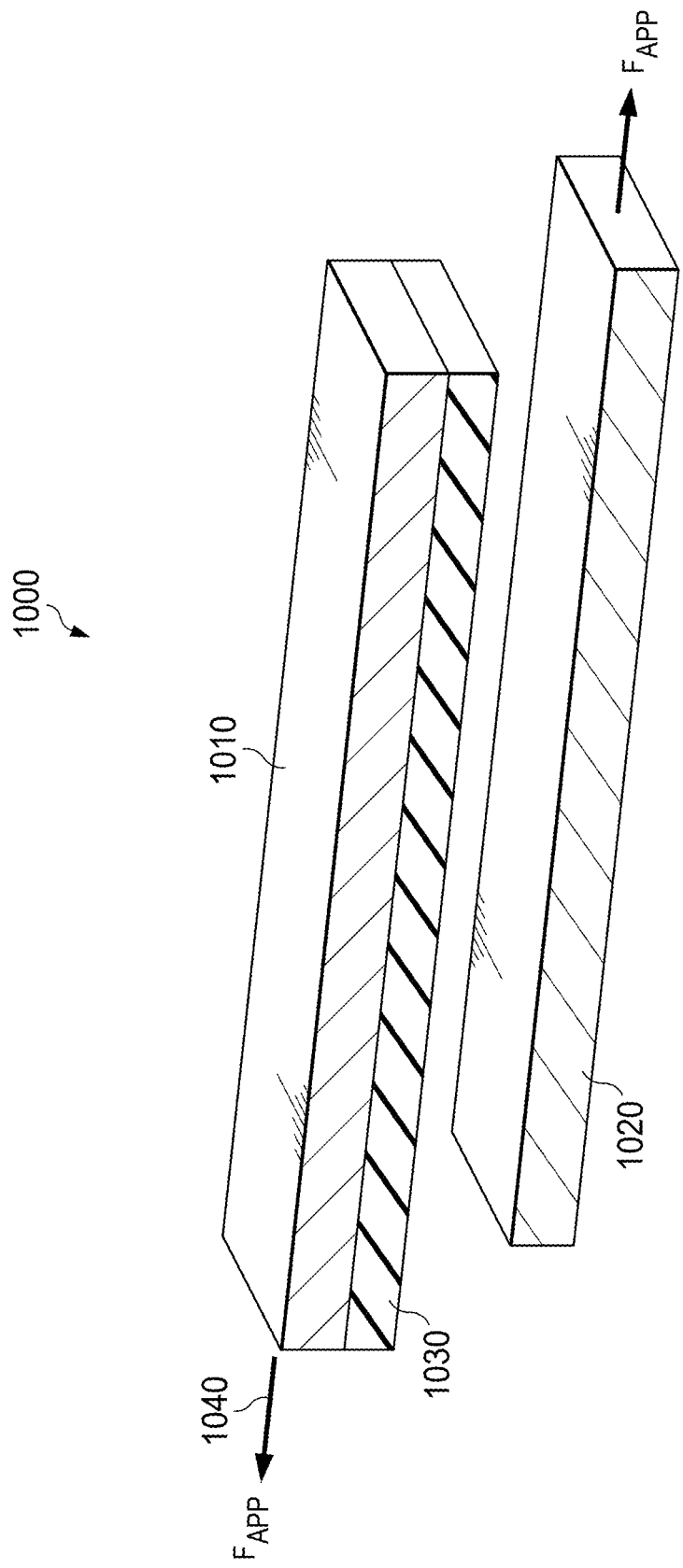
FIG. 10A is a side perspective view of an electrostatic clutch or electro adhesive clutch, in accordance with at least one embodiment of the present disclosure.

FIG. 10A is a side perspective view of an electrostatic clutch or electro adhesive clutch 1000, in accordance with at least one embodiment of the present disclosure. In the example shown in FIG. 10A, the clutch 1000 includes a positive electrode 1010, a negative electrode 1020, and a dielectric material 1030 to prevent electrical contact between the positive electrode 1010 and negative electrode 1020. With no voltage applied between the electrodes, an applied force 1040 causes the positive electrode 1010 and negative electrode 1020 to slide relative to one another.

Figure 10B:
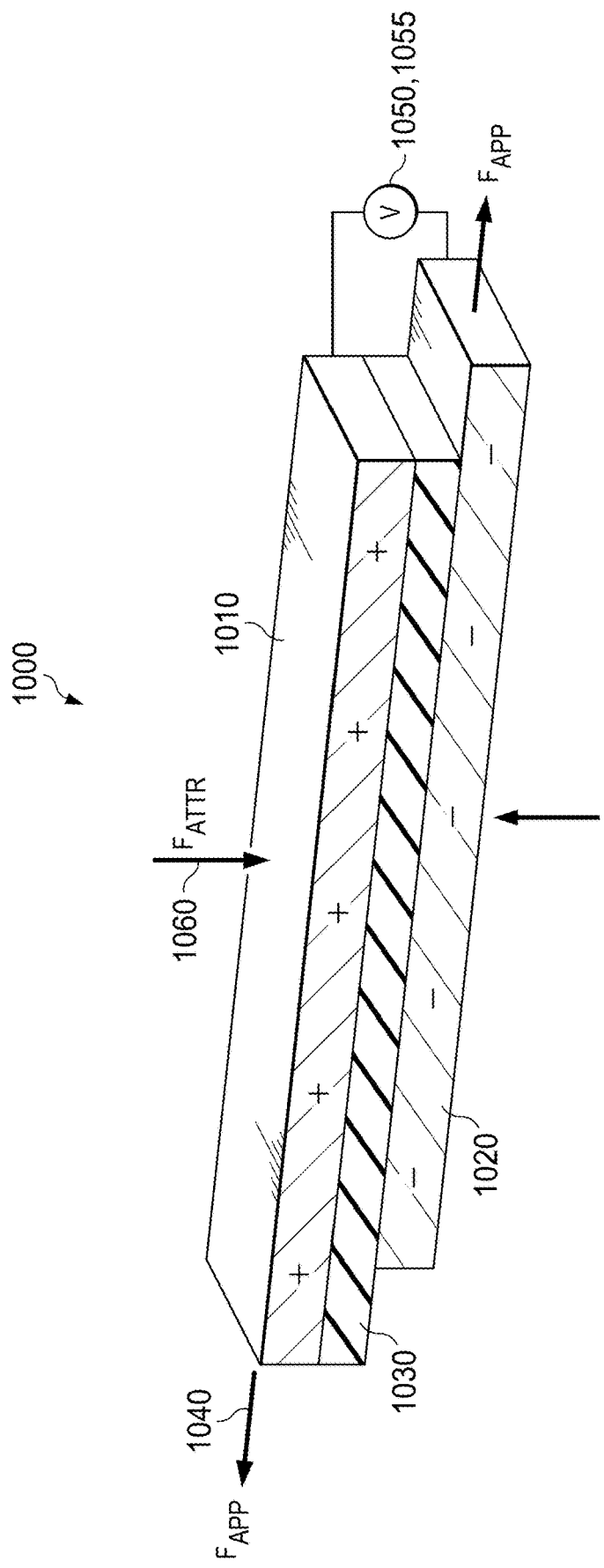
FIG. 10B is a side perspective view of an electrostatic clutch or electro adhesive clutch, in accordance with at least one embodiment of the present disclosure.

FIG. 10B is a side perspective view of an electrostatic clutch or electro adhesive clutch 1000, in accordance with at least one embodiment of the present disclosure. In the example shown in FIG. 10B, a voltage source 1050 applies a voltage 1055 between the positive electrode 1010 and the negative electrode 1020, causing an attractive force 1060 that creates friction at the interface between the dielectric layer 1030 and the negative electrode 1020. In this state, the friction caused by the attractive force 1060 prevents the applied force 1040 from sliding the positive electrode 1010 and negative electrode 1020 relative to one another.

It is noted that both electrodes may be coated with the dielectric material, and that in some cases there may be no physical difference between the positive and negative electrodes except in how they're wired. It is further noted that reversing the polarity on the electrodes may not affect the functioning of the electrostatic clutch.

In an example, the electrostatic clutch 1000 can generate a holding force of greater than 30 Newtons per square centimeter of electrode contact area at an applied voltage of 200 V, and may in some cases exceed the tensile strength of the substrate materials. Depending on the implementation, applied voltages may range from 50-300 volts, although other values both larger and smaller may be used instead or in addition. Engagement times for the electrostatic clutch may be 5-15 milliseconds, and when the clutch is affixed to a tightly folded airbag such that there is already some compressive force applied between the positive and negative electrodes, the engagement time may be less than 5 milliseconds. This may require a highly responsive voltage source, such as a capacitor, that is capable driving the circuit from zero to 50-500 V in less than 5 milliseconds, with instantaneous currents in the range of 0.1-5.0 mA. Disengagement time for the electrostatic clutch may be approximately 5-50 milliseconds.

Figure 11A:
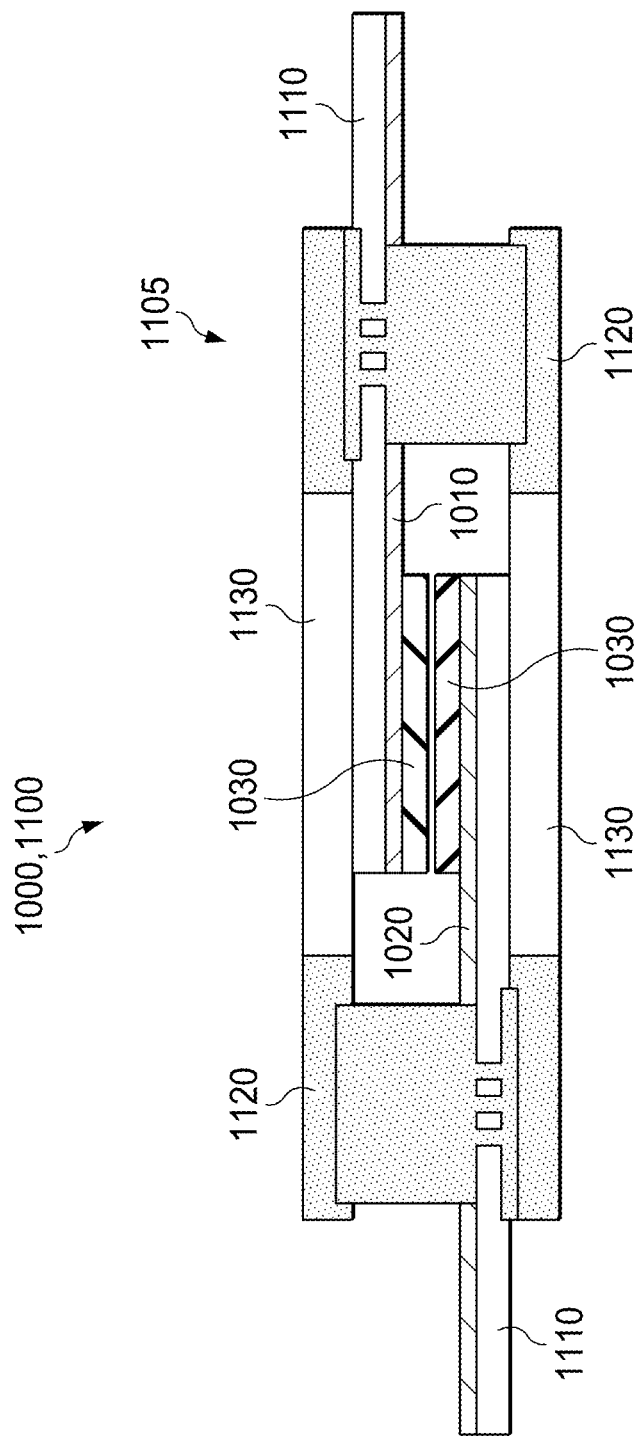
FIG. 11A is a schematic, diagrammatic side view of an example electrostatic clutch forming an active tether, in accordance with at least one embodiment of the present disclosure.

FIG. 11A is a schematic, diagrammatic side view of an example electrostatic clutch 1000 forming an active, elongatable tether 1100, in accordance with at least one embodiment of the present disclosure. In the example shown in FIG. 11A, the tether 1100 includes the positive electrode 1010 and negative electrode 1020, each attached to (e.g., deposited onto) a substrate layer 1110 and covered at least partially by a dielectric layer 1030. The substrates 1110 fit within a sleeve 1105, which includes two slip fittings 1120 and two sleeve surfaces 1130.

Figure 11B:
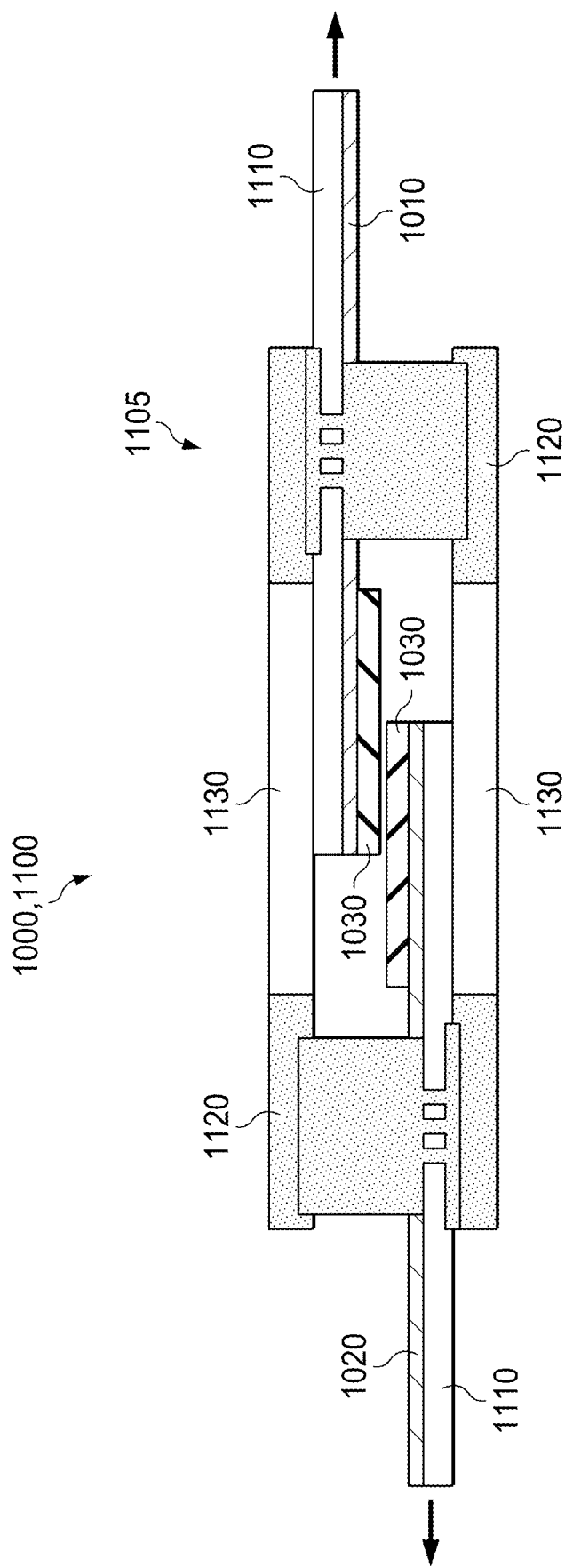
FIG. 11B is a schematic, diagrammatic side view of an example electrostatic clutch forming an active tether, in accordance with at least one embodiment of the present disclosure.

FIG. 11B is a schematic, diagrammatic side view of an example electrostatic clutch 1000 forming an active, elongatable tether 1100, in accordance with at least one embodiment of the present disclosure. FIG. 11B is similar to FIG. 11A, except that both substrates 1110 have slid outward relative to the sleeve 1105. This may occur, for example, if the voltage to the electrodes 1010, 1020 is turned off, and a tension force is applied to the tether 1100.

The sleeve 1105, slip fittings 1120, and sleeve surfaces 1130 may for example be made of a stretchable polymer material such as silicone. The substrates 1110 may for example be made of a stiff, inelastic polymer such as mylar, or an inelastic fabric, or a combination thereof, and may be between 25 and 200 microns in thickness. The electrodes 1010, 1020 may for example be a thin (e.g., 5 micron) coating of aluminum on the inner surfaces of the substrates 1110. The dielectric material may for example be a coating of a polymer such as polyvinylidene fluoride (PVDF), P(VDF-TRFE-CTFE), P(VDF-HFP) and other polymers with high dielectric constant, possibly including a ceramic filler. These materials may support a high shearing force in the engaged state, while allowing the clutch mechanism to slide easily in the disengaged state.

Active airbag tethers based on electrostatic clutches are described for example in U.S. Pat. No. 11,718,264, which is incorporated by reference as though fully set forth herein.

Figure 12:
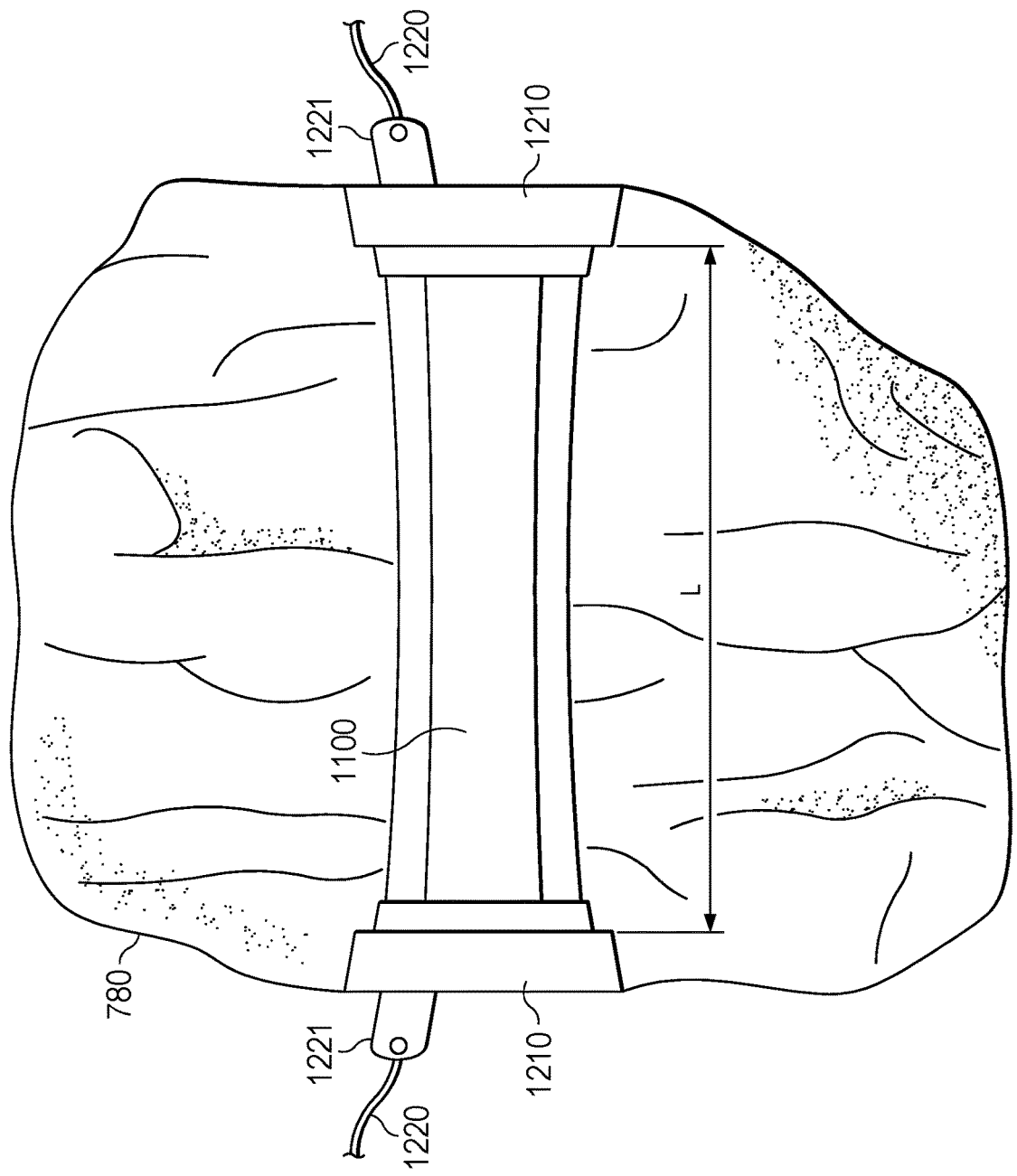
FIG. 12 is a front view of an airbag with an active tether attached, in accordance with at least one embodiment of the present disclosure.

FIG. 12 is a front view of an airbag 780 with an active tether 1100 attached, in accordance with at least one embodiment of the present disclosure. The active tether 1100 is attached (e.g., stitched with heavy-duty nylon thread) to the airbag at its ends, by two attachment points 1210, and is actuated (e.g., prevented from lengthening) by a voltage applied via wires 1220. Also visible are wire attachments 1221. The tether has an unexpanded length L. When the active tether 1100 is engaged or actuated (e.g., prevented from lengthening) by the voltage, the portion of the airbag 780 that lies between the attachment points 1210 is prevented from expanding to a length greater than L, which thus controls the size and shape of the airbag 780 as it inflates. Depending on the implementation, the active, elongatable tether 1100 may be attached on the inside or outside of the airbag. In its contracted state, the active tether may for example be between 3" and 24" in length, and may be capable in its off state of lengthening to 2-5 times its contracted length, or more.

Figure 13A:
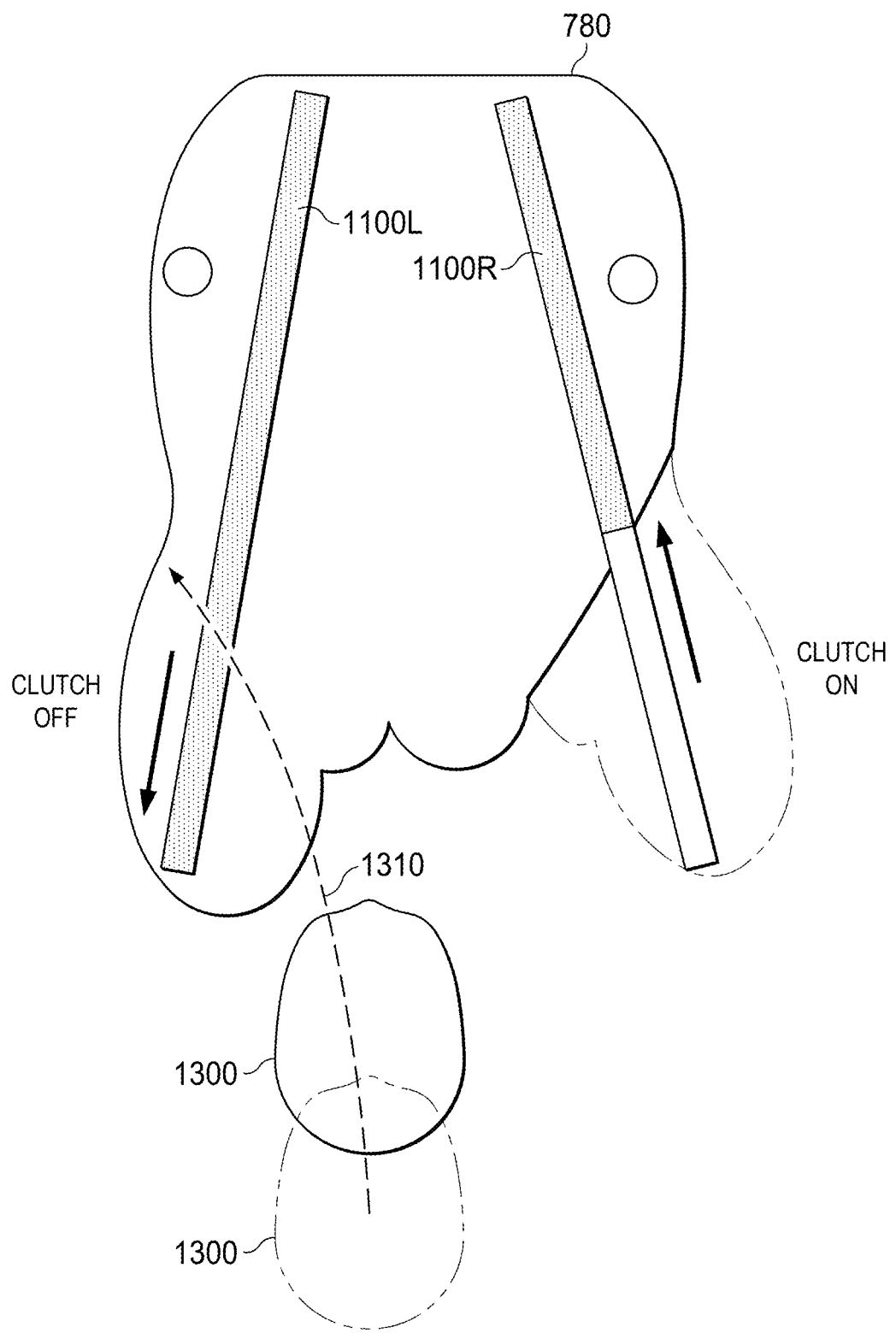
FIG. 13A is a schematic, diagrammatic view of a shape-controlled airbag in a left-hand offset crash, in accordance with at least one embodiment of the present disclosure.

FIG. 13A is a schematic, diagrammatic view of a shape-controlled airbag 780 in a left-hand offset crash, in accordance with at least one embodiment of the present disclosure. Because of the left-hand offset crash mode, a vehicle occupant's head 1300 moves in a forward-left curving trajectory 1310 relative to the airbag 780. Thus, the crash ECU has responded by engaging the electrostatic clutch of the airbag's right tether 1100R, while disengaging (or leaving disengaged) the electrostatic clutch of the left tether 1100L. The resulting asymmetric airbag shape catches the head 1300 as it travels leftward.

Figure 13B:
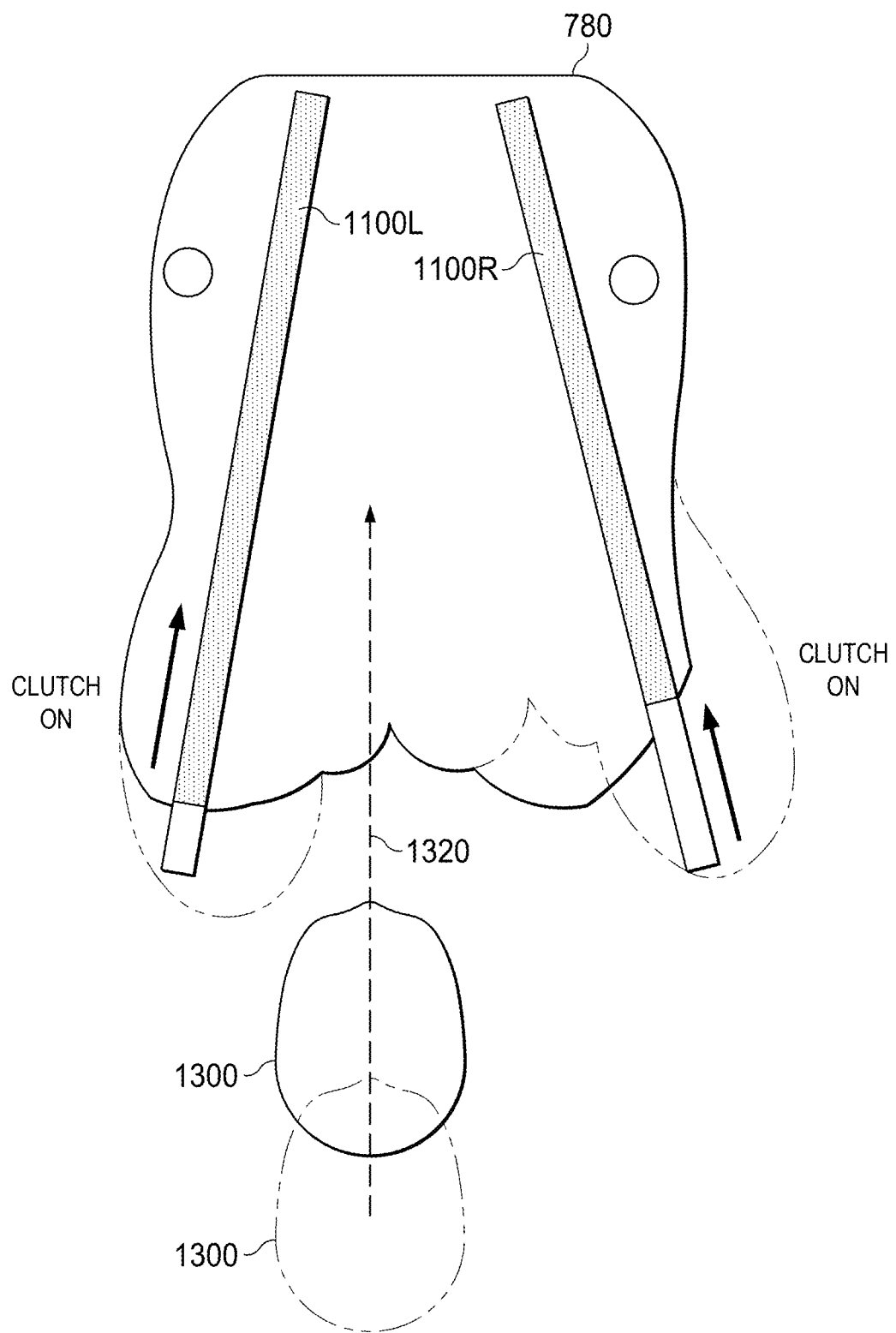
FIG. 13B is a schematic, diagrammatic view of a shape-controlled airbag in a front crash, in accordance with at least one embodiment of the present disclosure.

FIG. 13B is a schematic, diagrammatic view of a shape-controlled airbag 780 in a front crash, in accordance with at least one embodiment of the present disclosure. Because of the front crash mode, the vehicle occupant's head 1300 moves in a forward trajectory 1320 relative to the airbag 780. Thus, the crash ECU has responded by engaging the electrostatic clutches of both the airbag's right tether 1100R and left tether 1100L. The resulting symmetric airbag shape catches the head 1300 as it travels forward.

Figure 13C:
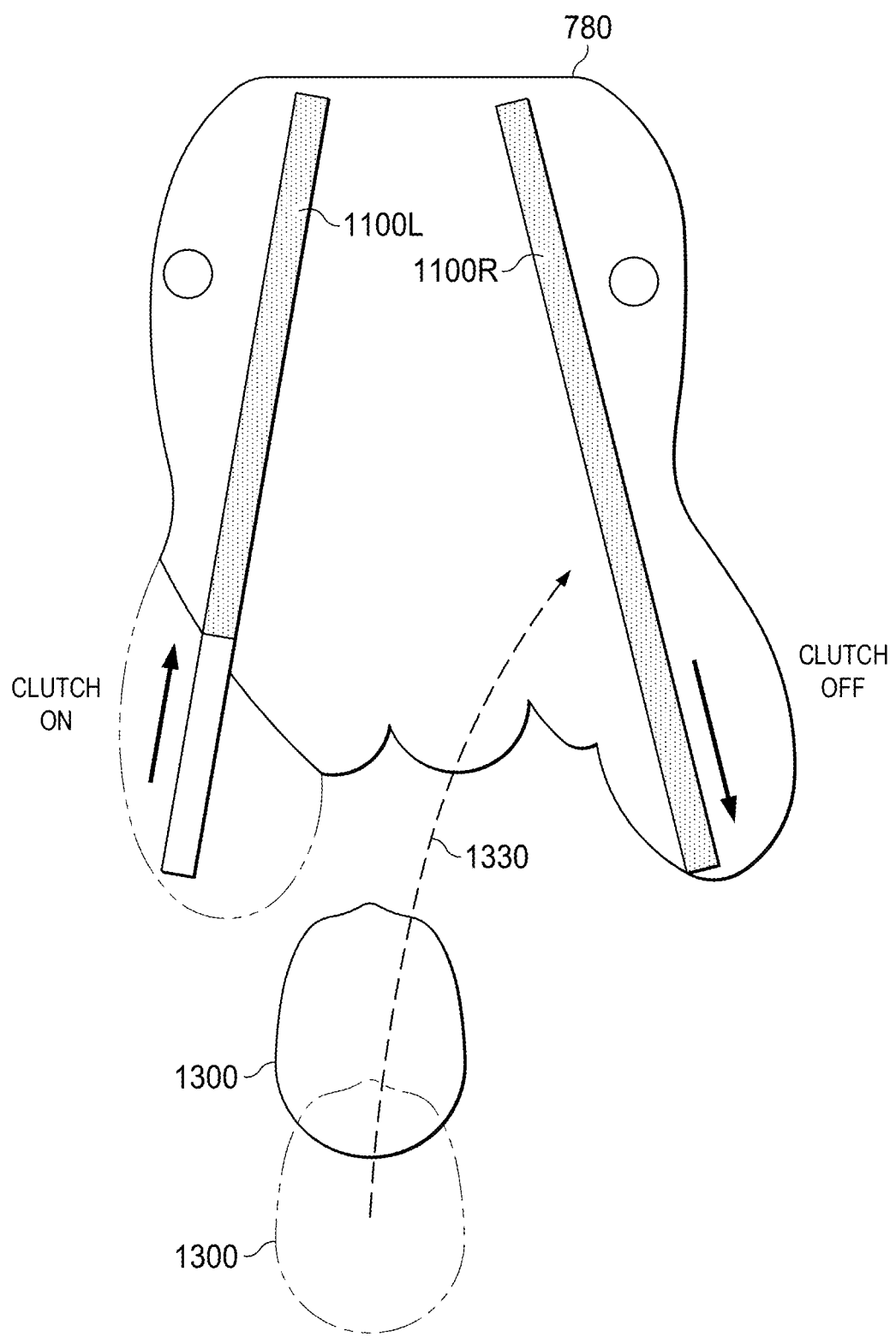
FIG. 13C is a schematic, diagrammatic view of a shape-controlled airbag in a right-hand offset crash, in accordance with at least one embodiment of the present disclosure.

FIG. 13C is a schematic, diagrammatic view of a shape-controlled airbag 780 in a right-hand offset crash, in accordance with at least one embodiment of the present disclosure. Because of the right-hand offset crash mode, a vehicle occupant's head 1300 moves in a forward-right curving trajectory 1330 relative to the airbag 780. Thus, the crash ECU has responded by engaging the electrostatic clutch of the airbag's left tether 1100L, while disengaging (or leaving disengaged) the electrostatic clutch of the right tether 1100R. The resulting asymmetric airbag shape catches the head 1300 as it travels rightward.

Thus, a single shape-controlled airbag is able to protect the head 1300 against at least three different crash modes. It is understood that the same principle can be applied to any airbag in the vehicle, whether in the dashboard, steering wheel, door panel, center console, roof, or other location, and that active tethers 1100 can be used to control a variety of different shapes, whether similar to or different than those shown in FIGS. 13A-13C, along any plane or axis of the airbag. For example, tethers may control size, shape, symmetry, or asymmetry along an up-down axis, a left-right axis, a front-rear axis, or combinations thereof.

Figure 14:
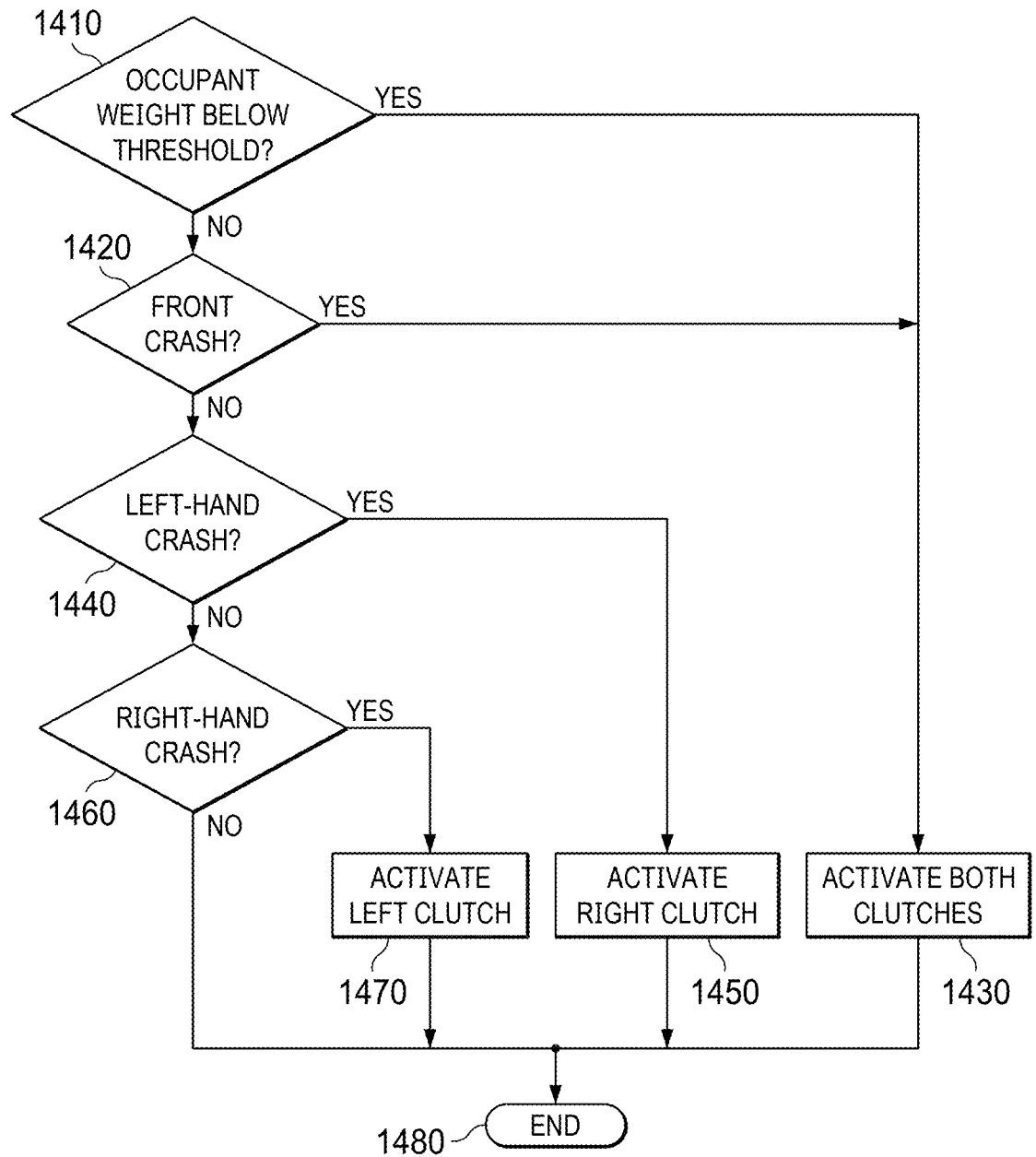
FIG. 14 is a schematic, diagrammatic representation, in flow diagram form, of an example airbag shape control method, in accordance with at least one embodiment of the present disclosure.

FIG. 14 is a schematic, diagrammatic representation, in flow diagram form, of an example airbag shape control method 1400, in accordance with at least one embodiment of the present disclosure. It is understood that the steps of method 1400 may be performed in a different order than shown in FIG. 14, additional steps can be provided before, during, and after the steps, and/or some of the steps described can be replaced or eliminated in other embodiments. One or more of steps of the method 1400 can be carried by one or more devices and/or systems described herein, such as components of the system 100, airbag shape deployment engine 142, OCS 710, crash ECU 720, and/or processor circuit 1550.

In block 1410, the method 1400 includes determining whether an occupant weight falls below a pre-determined threshold (e.g., 50 lbs.). If yes, execution proceeds to block 1430. If no, execution proceeds to block 1420.

In block 1420, the method 1400 includes determining whether a front crash is occurring. If yes, execution proceeds to block 1430. If no, execution proceed to block 1440.

In block 1430, the method 1400 includes activating both the left and right airbag tether clutches, to prevent lengthening of the left and right airbag tethers. Execution then proceeds to block 1480.

In block 1440, the method 1400 includes determining whether a left-hand crash is occurring. If yes, execution proceeds to block 1450. If no, execution proceeds to block 1460.

In block 1450, the method 1400 includes activating the right airbag tether clutch, to prevent lengthening of the right airbag tether. Execution then proceeds to block 1480.

In block 1460, the method 1400 includes determining whether a right-hand crash is occurring. If yes, execution proceeds to block 1470. If no, execution proceeds to block 1480.

In block 1470, the method 1400 includes activating the left airbag tether clutch, to prevent lengthening of the left airbag tether. Execution then proceeds to block 1480.

In block 1480, the method 1400 is complete.

Flow diagrams are provided herein for exemplary purposes; a person of ordinary skill in the art will recognize myriad variations that nonetheless fall within the scope of the present disclosure. For example, any of the blocks described herein may optionally include an output to a user of information relevant to the block, and may thus represent an improvement in the user interface over existing art by providing information not otherwise available.

Similarly, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, in order to control the shape of the airbag as it expands, actuation of the active tethers' electrostatic clutches may need to occur within 5 milliseconds after the sensors detect the crash.

Figure 15:
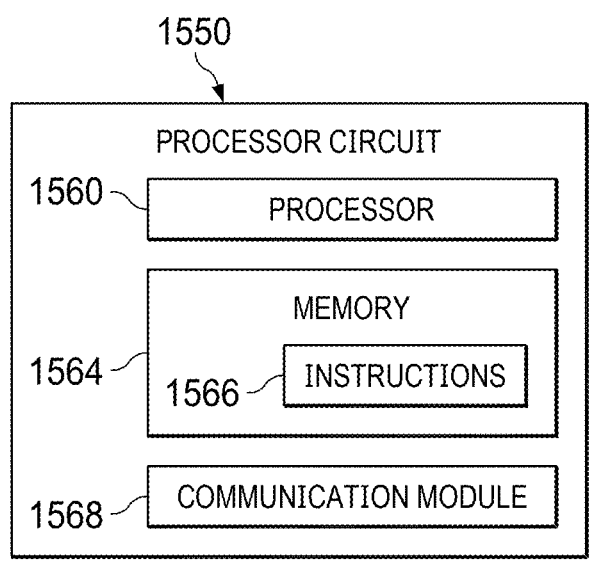
FIG. 15 is a diagrammatic illustration of a processor circuit, according to embodiments of the present disclosure.

FIG. 15 is a diagrammatic illustration of a processor circuit 1550, according to embodiments of the present disclosure. The processor circuit 1550 may be implemented in the shape-programmable airbag system 100, VCU 110, crash ECU 720, portable device 300, or other devices or workstations (e.g., third-party workstations, network routers, etc.), or on a cloud processor or other remote processing unit, as necessary to implement the method. As shown, the processor circuit 1550 may include a processor 1560, a memory 1564, and a communication module 1568. These elements may be in direct or indirect communication with each other, for example via one or more buses.

The processor 1560 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1560 may also comprise another hardware device, a firmware device, or any combination thereof configured to perform the operations described herein. The processor 1560 may also be implemented as a combination of computing devices, e.g., a combination of a DSP and a microprocessor, a plurality of microprocessors, one or more microprocessors in conjunction with a DSP core, or any other such configuration.

The memory 1564 may include a cache memory (e.g., a cache memory of the processor 860), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1564 includes a non-transitory computer-readable medium. The memory 1564 may store instructions 1566. The instructions 1566 may include instructions that, when executed by the processor 1560, cause the processor 1560 to perform the operations described herein. Instructions 1566 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1568 can include any electronic circuitry and/or logic circuitry to facilitate direct or indirect communication of data between the processor circuit 1550, and other processors or devices. In that regard, the communication module 1568 can be an input/output (I/O) device. In some instances, the communication module 1568 facilitates direct or indirect communication between various elements of the processor circuit 1550 and/or the shape-programmable airbag system 100. The communication module 1568 may communicate within the processor circuit 1550 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and a central server, or readings from the sensors) may be accomplished using any suitable wireless or wired communication technology, such as a cable interface such as a USB, micro USB, Lightning, or Fire Wire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the shape-programmable airbag advantageously permits the crash ECU of a vehicle to control the shape of an airbag as it expands, thus protecting vehicle occupants against a variety of different crash modes. Depending on the implementation, a number of variations are possible on the examples and embodiments described above. For example, different kinds of sensors may be employed. The electrostatic clutches may be replaced with other types of actuators, including but not limited to electrically, mechanically, magnetically, or chemically controlled clamps, ratchets, winders, tensioners, etc., without departing from the spirit of the present disclosure. In some instances, a tether may be partially actuated such that it is able to lengthen, but at a slower rate than the normal expansion of the airbag, thus controlling the shape of the airbag dynamically during expansion. In other instances, the tether may be a breakaway tether, such that at a certain point in the expansion of the airbag, the tension on the tether exceeds a pre-determined value, and the tether breaks and thus ceases to resist expansion of the airbag. The clutch can also be turned on or off at selected times during the crash event, to dynamically control expansion of the airbag. The technology may be applied to different vehicle types, including on-road and off-road cars and trucks, as well as aircraft and watercraft, or any other vehicle or apparatus where an airbag is used.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the shape-programmable airbag. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the shape-programmable airbag as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system comprising:
 a vehicle;
 an airbag disposed within the vehicle;
 an elongatable tether anchored to the airbag at a first end and a second end;
 an actuator configured to control the elongatable tether such that:
  in a first state of the actuator, the tether elongates when the airbag is inflated; and
  in a second state of the actuator, the tether does not elongate when the airbag is inflated,
   wherein the actuator is an electrostatic clutch or electroadhesive clutch.

2. The system of claim 1, wherein in the first state of the actuator, the airbag inflates to a first shape, and in the second state of the actuator, the tether causes the airbag to inflate to a second shape different than the first shape.

3. The system of claim 2, further comprising:
 at least one sensor disposed within the vehicle; and
 a control unit disposed within the vehicle and comprising a processor and a memory, wherein the control unit is configured to operate the actuator between the first state and the second state based on a measurement received from the at least one sensor.

4. The system of claim 3, wherein the measurement received from the at least one sensor is indicative of a mass or size of an occupant of the vehicle.

5. The system of claim 4, wherein if the mass or size of the occupant of the vehicle is below a threshold value, the control unit controls the actuator to be in the second state, such that the tether causes the airbag to inflate into the second shape.

6. The system of claim 5, wherein the second shape is configured for protection of the vehicle occupant of the size or mass below the threshold value.

7. The system of claim 3, wherein the measurement received from the at least one sensor is indicative of a crash mode.

8. The system of claim 7, wherein if the crash mode is a first crash mode, the control unit controls the actuator to be in the first state such that the airbag inflates into the first shape, and if the crash mode is a second crash mode, the control unit controls the actuator to be in the second state such that the airbag inflates into the second shape.

9. The system of claim 8, wherein the first shape is configured to protect a vehicle occupant in the first crash mode, and the second shape is configured to protect the vehicle occupant in the second mode.

10. The system of claim 1, further comprising:
 a second elongatable tether; and
 a second actuator configured to control the second elongatable tether such that:
  in a first state of the second actuator, the second elongatable tether elongates when the airbag is inflated; and
  in a second state of the second actuator, the second elongatable tether does not elongate when the airbag is inflated.

11. The system of claim 10, wherein the actuator is operable independently of the second actuator.

12. A method comprising:
 providing an airbag disposed within a vehicle;
 anchoring an elongatable tether to the airbag at a first end and a second end;
 with an actuator, controlling the elongatable tether such that:
  in a first state of the actuator, the tether elongates when the airbag is inflated; and
  in a second state of the actuator, the tether does not elongate when the airbag is inflated,
   wherein the actuator is an electrostatic clutch or electroadhesive clutch.

13. The method of claim 12, wherein in the first state of the actuator, the airbag inflates to a first shape, and in the second state of the actuator, the tether causes the airbag to inflate to a second shape different than the first shape.

14. The method of claim 13, further comprising:
 providing at least one sensor disposed within the vehicle; and
 with a control unit disposed within the vehicle and comprising a processor and a memory, operating the actuator between the first state and the second state based on a measurement received from the at least one sensor.

15. The method of claim 14, wherein the measurement received from the at least one sensor is indicative of a mass or size of an occupant of the vehicle.

16. The method of claim 15, wherein if the mass or size of the occupant of the vehicle is below a threshold value, the control unit controls the actuator to be in the second state, such that the tether causes the airbag to inflate into the second shape.

17. The method of claim 14, wherein the measurement received from the at least one sensor is indicative of a crash mode.

18. The method of claim 17, wherein if the crash mode is a first crash mode, the control unit controls the actuator to be in the first state such that the airbag inflates into the first shape, and if the crash mode is a second crash mode, the control unit controls the actuator to be in the second state such that the airbag inflates into the second shape.

19. An apparatus comprising:
 an airbag;
 an elongatable tether stitched to the airbag at a first end and a second end;
 an electrostatic clutch or electroadhesive clutch configured to control the elongatable tether such that:
  in an off state of the electrostatic clutch or electroadhesive clutch, the tether elongates when the airbag is inflated such that the airbag inflates to a first shape; and
  in an on state of the electrostatic clutch or electroadhesive clutch, the tether does not elongate when the airbag is inflated, such that the airbag inflates to a second shape different than the first shape.

* * * * *